United States Patent
Ali

(10) Patent No.: US 12,354,073 B2
(45) Date of Patent: Jul. 8, 2025

(54) PROVIDING REMOTE ACCESS TO A SELECT PORTION OF A TRANSACTION INTERFACE DURING A TRANSACTION AT A TRANSACTION TERMINAL

(71) Applicant: NCR Voyix Corporation, Atlanta, GA (US)

(72) Inventor: Sarfaraz Ali, Telangana (IN)

(73) Assignee: NCR Voyix Corporation, Atlanta, GA (US)

( * ) Notice: Subject to any disclaimer, the term of this patent is extended or adjusted under 35 U.S.C. 154(b) by 117 days.

(21) Appl. No.: 17/658,680

(22) Filed: Apr. 11, 2022

(65) Prior Publication Data

US 2023/0325800 A1 Oct. 12, 2023

(51) Int. Cl.
| | |
|---|---|
| *G06Q 20/18* | (2012.01) |
| *G06Q 20/20* | (2012.01) |
| *H04L 67/08* | (2022.01) |
| *H04L 67/133* | (2022.01) |

(52) U.S. Cl.
CPC ............ *G06Q 20/18* (2013.01); *G06Q 20/20* (2013.01); *H04L 67/08* (2013.01); *H04L 67/133* (2022.05)

(58) Field of Classification Search
CPC ...... G06Q 20/18; G06Q 20/20; H04L 67/133; H05L 67/08

USPC .......................................................... 705/42
See application file for complete search history.

(56) References Cited

U.S. PATENT DOCUMENTS

| 6,115,711 A * | 9/2000 | White ...................... G06F 9/46 707/999.102 |
| 7,404,177 B1 * | 7/2008 | Greenfield ................ G06F 8/70 717/106 |
| 2019/0197181 A1 * | 6/2019 | Li ........................... G06F 9/466 |
| 2021/0226774 A1 * | 7/2021 | Padmanabhan ....... H04L 9/0643 |
| 2022/0035625 A1 * | 2/2022 | Morgan .................... G06F 8/20 |

OTHER PUBLICATIONS

"Business-to-business e-commerce frameworks", author: SSY Shim, published in 2000. (Year: 2000).*

* cited by examiner

*Primary Examiner* — Hai Tran
(74) *Attorney, Agent, or Firm* — Schwegman Lundberg & Woessner, P.A.

(57) ABSTRACT

A portion of a Transaction Interface (TI) is overridden and remotely controlled during a transaction at a transaction terminal. The portion is remotely hosted from the terminal and controlled during the interaction through interaction with an agent on the terminal and a remote host application on a cloud/server. The portion overrides an existing screen or object of the TI without altering the TI workflow and other existing screens and objects associated with the TI workflow during the transaction. The portion may be content or a service that is remotely hosted from the cloud/server.

12 Claims, 3 Drawing Sheets

PROVIDING REMOTE ACCESS TO A SELECT PORTION OF A TRANSACTION INTERFACE DURING A TRANSACTION AT A TRANSACTION TERMINAL

BACKGROUND

More and more consumers are using Self-Service Terminals (SSTs) for Self-Checkouts (SCOs)). Consumers have either grown use to the technology of performing SCOs or have been forced to use the SCOs at a higher rate because of the COVID19 pandemic. The technology for SCOs have been around for many years, but with the lack of available workers and concern of virus exposure, many retailers were forced to accelerate their customers adoption of the technology. Many businesses simply did not have enough cashiers to handle the increased checkout traffic during the pandemic. A positive result of this was that SCO adoption rates skyrocketed, such that now even with the pandemic waning, retailers are proactively increasing usage of SSTs with their customers.

During a SCO, a customer interacts with a touch-based customer-facing interface. Items being purchased are identified when the customers swipe item barcodes over a built-in scanner or scan them with a mobile scanner associated with the SSTs. The touch-based interface is continuously updated based on the state of the interface and item information for items that are scanned. When the customer is ready to pay for the items, the customer touches a pay now option of the interface. A card reader or a media depository is activated for the customer to either insert a payment card into the reader or insert currency into the media depository.

A retailer has the captive attention of its customer during a SCO, the customer is focused on the information being presented on the touch interface to ensure items are accurately being recorded and to ensure the checkout proceeds quickly and efficiently. Garnering the attention of a customer is considered to be very valuable to retailers for purposes of understanding their customers more completely, developing trusted relationships with their customers, and upselling their customers to additional products offered by the retailers or offered by partners of the retailers. Yet, very little technology has been deployed to date via SSTs by retailers even though a SCO presents a perfect opportunity for the retailers to engage their customers.

SUMMARY

In various embodiments, system and methods for providing remote access to a portion of a transaction interface during a transaction at a transaction terminal are presented.

According to an aspect, a method for providing remote access to a portion of a transaction interface during a transaction at a transaction terminal is presented. A portion of a transaction interface is linked to an override object and the portion is communicated to an agent on a transaction terminal associated with the transaction interface. A request is received for the override object from the agent during a transaction on the transaction terminal. The override object, which is rendered by the agent within the portion of the transaction interface during the transaction, is remotely hosted for the agent.

DETAILED DESCRIPTION

Figure 1:
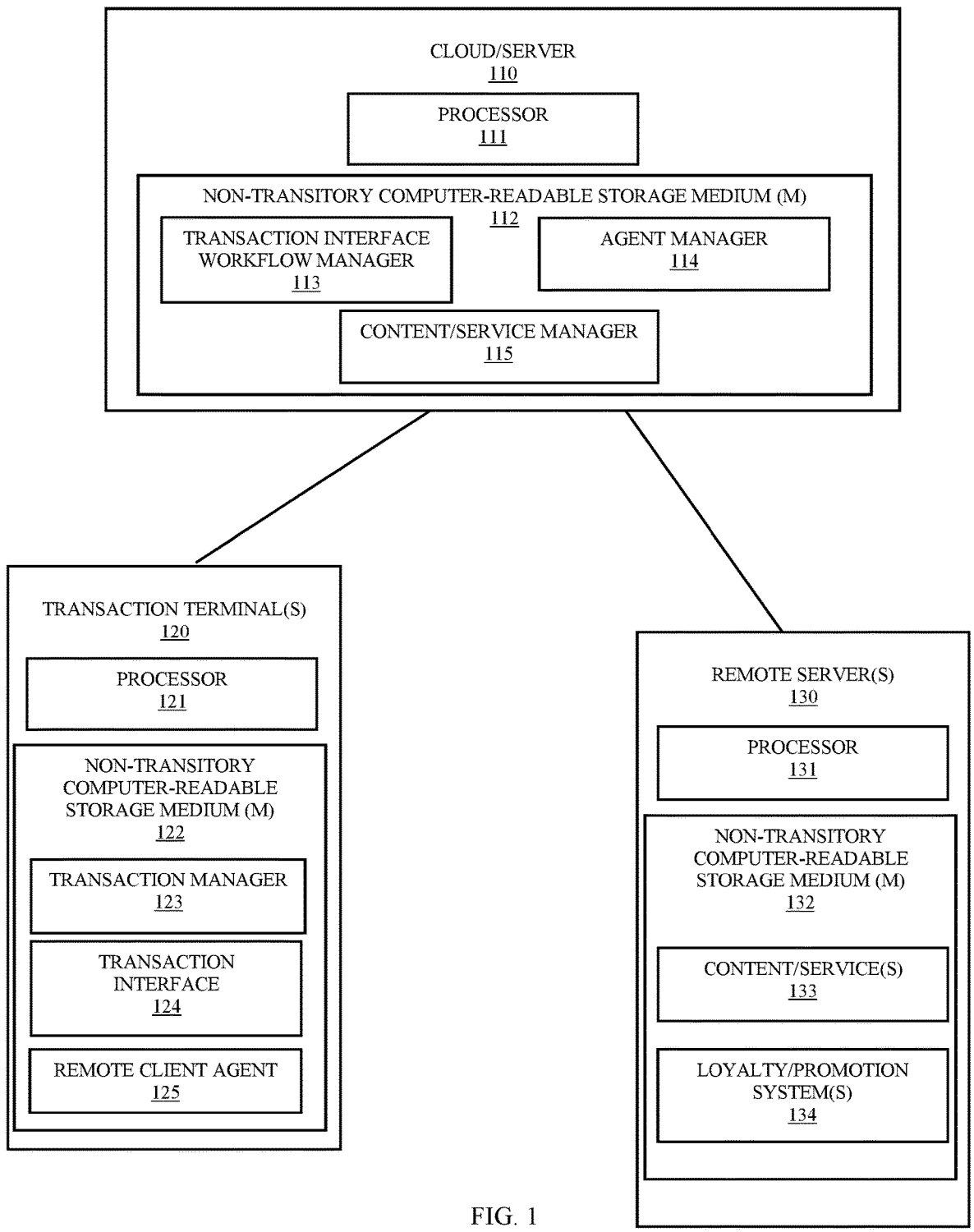
FIG. 1 is a diagram of a system for providing remote access to a portion of a transaction interface during a transaction at a transaction terminal according to an example embodiment.

FIG. 1 is a diagram of a system 100 for providing remote access to a portion of a transaction interface during a transaction at a transaction terminal, according to an example embodiment. It is to be noted that the components are shown schematically in greatly simplified form, with only those components relevant to understanding of the embodiments being illustrated.

Furthermore, the various components (that are identified in FIG. 1) are illustrated and the arrangement of the components is presented for purposes of illustration only. It is to be noted that other arrangements with more or less components are possible without departing from the teachings of providing remote access to a portion of a transaction interface during a transaction at a transaction terminal presented herein and below.

As will be discussed more completely herein and below, system 100 permits a store of a retailer to dynamically change and use a portion of its transaction interface during a transaction to present content and/or in that portion and/or through that portion of the transaction interface. The portion of the interface is controlled remotely by system 100 during the transaction and the content or service is delivered via an agent on the SST. Interaction between the agent and a remote agent manager of system 100 allows existing retailer content, existing promotional service, third-party content, and/or third-party services to be presented and offered through the portion of the interface while the transaction continues to be processed without interruption on the SST by a transaction manager of the SST.

This allows the retailer to utilize the portion of the interface during a time (SCO) where the retailer knows the attention of the customer is obtained for purposes of providing content or services of the retailer and/or licensing third-party content or services of third-party partners of the retailer. Additionally, since the attention of the customer is known to be focused during SCOs, the retailers may experience an increase in redemption rates on current promotions by offering the promotions through the portion of the transaction interface.

System 100 comprises a cloud/server 110, transaction terminals 120, and remote servers 130 (remotely located over a network relative to a given store associated with a given transaction terminal 120).

Cloud/Server 100 comprises a processor 111 and a non-transitory computer-readable storage medium 112. Medium 112 comprises executable instructions for a Transaction Interface (TI) workflow manager 113, an agent manager 114, and a content/service manager. Processor 111 obtains or is provided the executable instructions from medium 112 causing processor 111 to perform operations discussed herein and below with respect to 113-115.

Each transaction terminal 120 comprises a processor 121 and a non-transitory computer-readable storage medium 122. Medium 132 comprises executable instructions for a transaction manager 123, a TI 124, and a remote client agent 125. Processor 121 obtains or is provided the executable instructions from medium 122 causing processor 121 to perform operations discussed herein and below with respect to 123-125.

Each remote server 130 comprises a processor 131 and a non-transitory computer-readable storage medium 132. Medium 132 comprises executable instructions for a content/service 133 and/or a loyalty/promotion system 134. Processor 131 obtains or is provided the executable instructions from medium 132 causing processor 131 to perform operations discussed herein and below with respect to 133-134.

Initially, a retailer associated with a given transaction terminal 120 or a set of transaction terminals 121 interacts through a user facing interface to identify interface states for the transaction interface 124 and interface objects/screens associated with objects/screens rendered within the interface for each of the interface states. The transaction states may comprises a pre-transaction initiation state (associated with a splash screen that states touch here to start a transaction or scan an item to begin a transaction), a scan state or enter item code state (associated with items being recorded during the transaction), an item code lookup state (associated with searching a selecting an item code for an item that lacks an item code or that includes a code that is damaged and cannot be scanned), and a payment state (associated with obtaining a payment method (card or cash) from a customer. Each state further includes identifiers for specific transaction objects/screen identifiers that are available for the corresponding state. For example, a scan state my include an item screen or object for displaying current information about a scanned item, a running total screen or object for displaying a running total for the transaction, a search screen or object for searching for an item, an assistance required screen or object for requesting assistance, and/or a volume or settings screen or object for adjusting the volume of any other settings associated with the TI 123. The retailer provides the interface states and each available or currently rendered transaction screen or object for each state to the content/service manager 115 through the user-facing interface of the content/service manager 115. Next, the retailer is presented with a list of override content/services that the retailer can select and link to each interface state and to a particular screen or object with the corresponding interface state. The list may include an existing content/service associated with a loyalty/promotion system 134 of a server 130 for the retailer or may include a third-party content/service 133 associated with a third-party partner server 130 of a third-party partner.

In an embodiment, cloud/server 130 manages the workflows of the TIs 124 for the retailers and their transaction terminals 120, such that the interface states and the screens or objects for each state can be provided to a user associated with the retailer for selection and modification via the user-facing interface of content/service manager 115.

Content/Service manager 115 uses the interface states and the override selections of content/services to specific state-based screens or objects to configure agent manager 114 for interaction with both remote client agent 125 and the corresponding content/service 133 and/or loyalty promotion system 134 of the corresponding remote server 130. Content/Service manager 115 may also provide an interface workflow from workflow manager 113 to the agent manager 114 during configuration for a given transaction terminal 120. The interface workflow may permit agent manager 114 to pre-acquire and cache a given content/service 133 in advance of a given transaction for faster delivery to the remote client agent 125 when a given screen or object is being replaced or overridden within a given interface state of the interface workflow. In some cases, the content/service may be cached as a link to the corresponding content/service 133.

Agent manager 114 may also normalize any content associated with content/service 133 into fonts, sizes, colors, styles, themes, or spoken languages associated with the TI 124 by using a profile or settings associated with the transaction terminal 120 and normalizing attributes and properties associated with the content to be consistent with the profile or settings of the terminal 120.

Remote client agent is given a list of interface states and the corresponding screen or objects within each state that agent manager 114 wants to override or control during a given transaction. The list is provided through an Application Programming Interface (API) to TI 124 on terminal 120. So, when a state is encountered during a given transaction being processed by transaction manager 123 on terminal 120, TI 124 provides control to the screen or object to remote client agent 125. Agent 125 operates as a remote desktop application for that screen or object within the TI 124. Agent 125 interacts with agent manager 124 to obtain the content/service and plays or renders the content/service within the corresponding screen or as the object within the TI 124 during the interface state for the transaction.

Remote client agent maintains metrics with respect to customer interaction with the overridden portion (screen or object) of the TI 123 during the transaction and provides those metrics at the conclusion of the transaction to agent manager 114. Alternatively agent 125 maintains a log of metrics for multiple transactions and periodically sends the log with the metrics to agent manager 114.

When the overridden portion of the screen or object is a service 133, the service 133 is hosted by agent manager 114 from cloud server, such that interaction by a customer during a transaction with the service 133 is proxied by agent manager 114 with the corresponding remote server 130 and corresponding service 133.

Any purchase made of an additional product by a customer as a result of interaction with the overridden screen or object, can have details for the purchase relayed by the agent 125 to the transaction manager 123 via an API. In this way, transaction manager 123 can reflect the purchase during the transaction in a running transaction total summary screen or object.

In an embodiment, remote client agent is a Remote Desktop client application while agent manager 114 is a Remote Desktop server application. The Remote desktop server application is a WindowsFormsHost® implemented using a Next-Generation User Interface® base. In an embodiment, interaction between the agent manager 114 and agent 125 is achieved using a Windows® Presentation Foundation Layer®.

In an embodiment, the portion of the TI 124 that is overridden and hosted remotely by agent manager 114 is a card screen or card object unused during a TI scan and/or bagging state of the TI 124.

In an embodiment, remote client agent 125 utilizes an auto connection Remote Desktop Protocol (RDP) to the agent manager 114 for the portion being overridden and remotely hosted by the TI 124 when a TI state changes within the TI 124. Auto login is also processed by the agent with agent manager 114 while RDP is being initialized for any given transaction.

In an embodiment, transaction terminal 120 is an SST, a Point-Of-Sale (POS) terminal, a kiosk, or an Automated Teller Machine (ATM).

The above-referenced embodiments and other embodiments are now discussed with reference to FIGS. 2-3.

Figure 2:
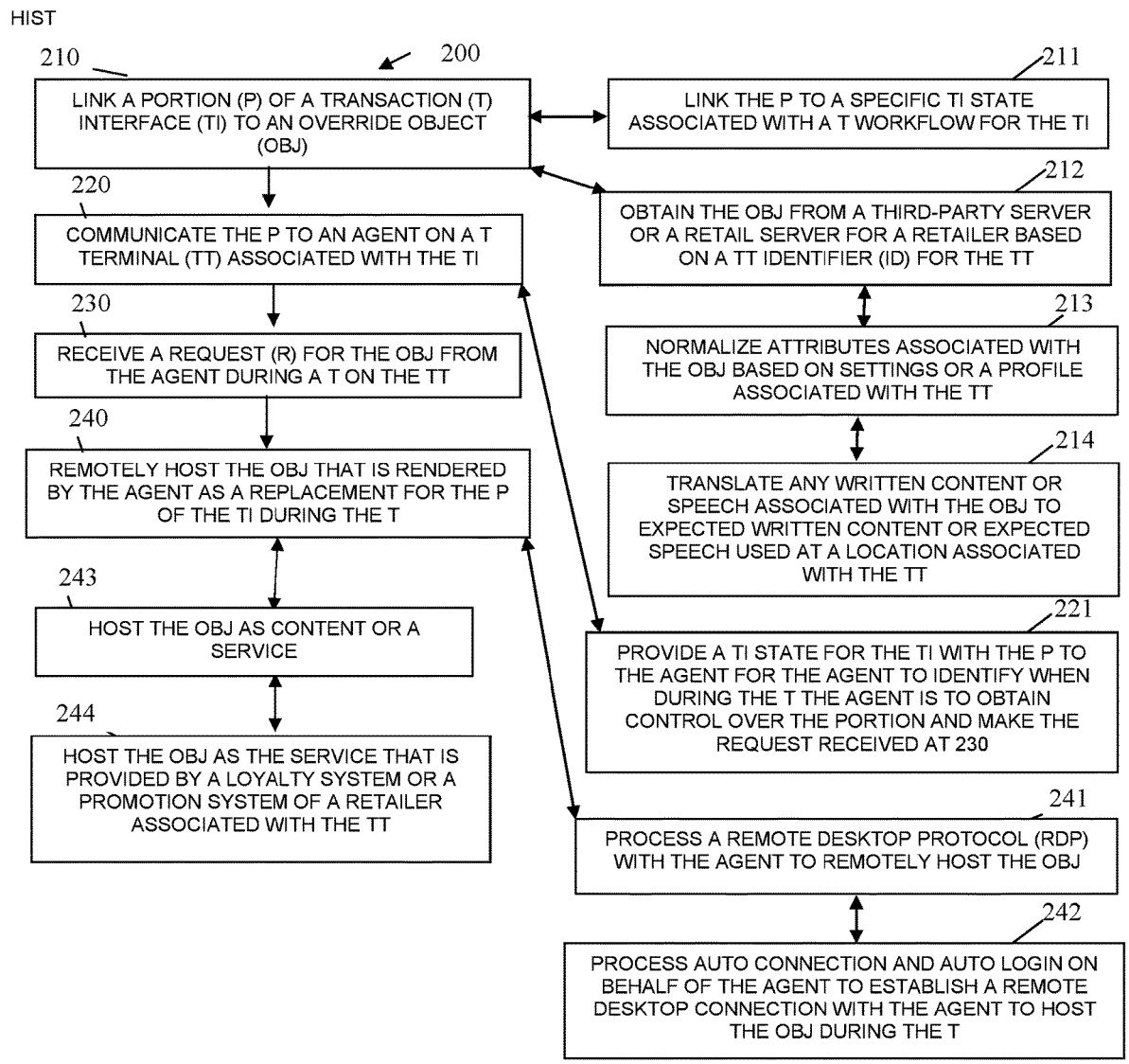
FIG. 2 is a diagram of a method for providing remote access to a portion of a transaction interface during a transaction at a transaction terminal, according to an example embodiment.

FIG. 2 is a diagram of a method 200 for providing remote access to a portion of a transaction interface during a transaction at a transaction terminal, according to an example embodiment. The software module(s) that implements the method 200 is referred to as a "TI screen/object override remote manager." The TI screen/object override remote manager is implemented as executable instructions programmed and residing within memory and/or a non-transitory computer-readable (processor-readable) storage medium and executed by one or more processors of one or more devices. The processor(s) of the device(s) that executes the TI screen/object override remote manager are specifically configured and programmed to process the TI screen/object override remote manager. The TI screen/object override remote manager has access to one or more network connections during its processing. The connections can be wired, wireless, or a combination of wired and wireless.

In an embodiment, the device that executes TI screen/object override remote manager is cloud 110. In an embodiment, the device that executes TI screen/object override remote manager is server 110.

In an embodiment, the TI screen/object override remote manager is all of, or some combination of TI workflow manager 113, agent manager 114, and/or content/service manager 115.

At 210, the TI screen/object override remote manager links a portion of a transaction interface (TI) 124 to an override object.

In an embodiment, at 211, the TI screen/object override remote manager links the portion to a specific TI state associated with a TI workflow for the TI 124.

In an embodiment of 211 and at 212, the TI screen/object override remote manager obtains the override object from a third-party server 130 or a retail server 130 for a retailer based on a transaction terminal identifier for a transaction terminal 120.

In an embodiment of 212 and at 213, the TI screen/object override remote manager normalizes attributes (such as visual attributes, etc.) associated with the override object based on settings or a profile associated with the transaction terminal 120.

In an embodiment of 213 and at 214, the TI screen/object override remote manager translates any written content or speech associated with the override object to expected written content or expected speech used at a location associated with the transaction terminal 120.

At 220, the TI screen/object override remote manager communicates the portion to an agent 125 on the transaction terminal 120 associated with the transaction interface 124.

In an embodiment, at 221, the TI screen/object override remote manager provides a TI state with the portion to the agent 125 for the agent 125 to identify when during the transaction that the agent is to obtain control over the portion and make the request received at 230 below.

At 230, the TI screen/object override remote manager receives a request for the override object from the agent 125 during a transaction on the transaction terminal 120.

At 240, the TI screen/object override remote manager remotely hosts the override object that is rendered by the agent 125 as a replacement for the portion of the transaction interface 124 during the transaction.

In an embodiment, at 241, the TI screen/object override remote manager processes a Remote Desktop Protocol (RDP) with the agent 125 to remotely host the override object.

In an embodiment of 241 and at 242, the TI screen/object override remote manager processes auto connection and auto login on behalf of the agent 125 to establish a remote desktop connection with the agent 125 to host the override object during the transaction.

In an embodiment of 240 and at 243, the TI screen/object override remote manager hosts the override object as content 133 or a service 133 being remotely hosted to the transaction terminal during the transaction.

In an embodiment of 243 and at 244, the TI screen/object override remote manager hosts the override object as the service that is provided by a loyalty system 134 or a promotion system 134 of a retailer associated with the transaction terminal 120.

Figure 3:
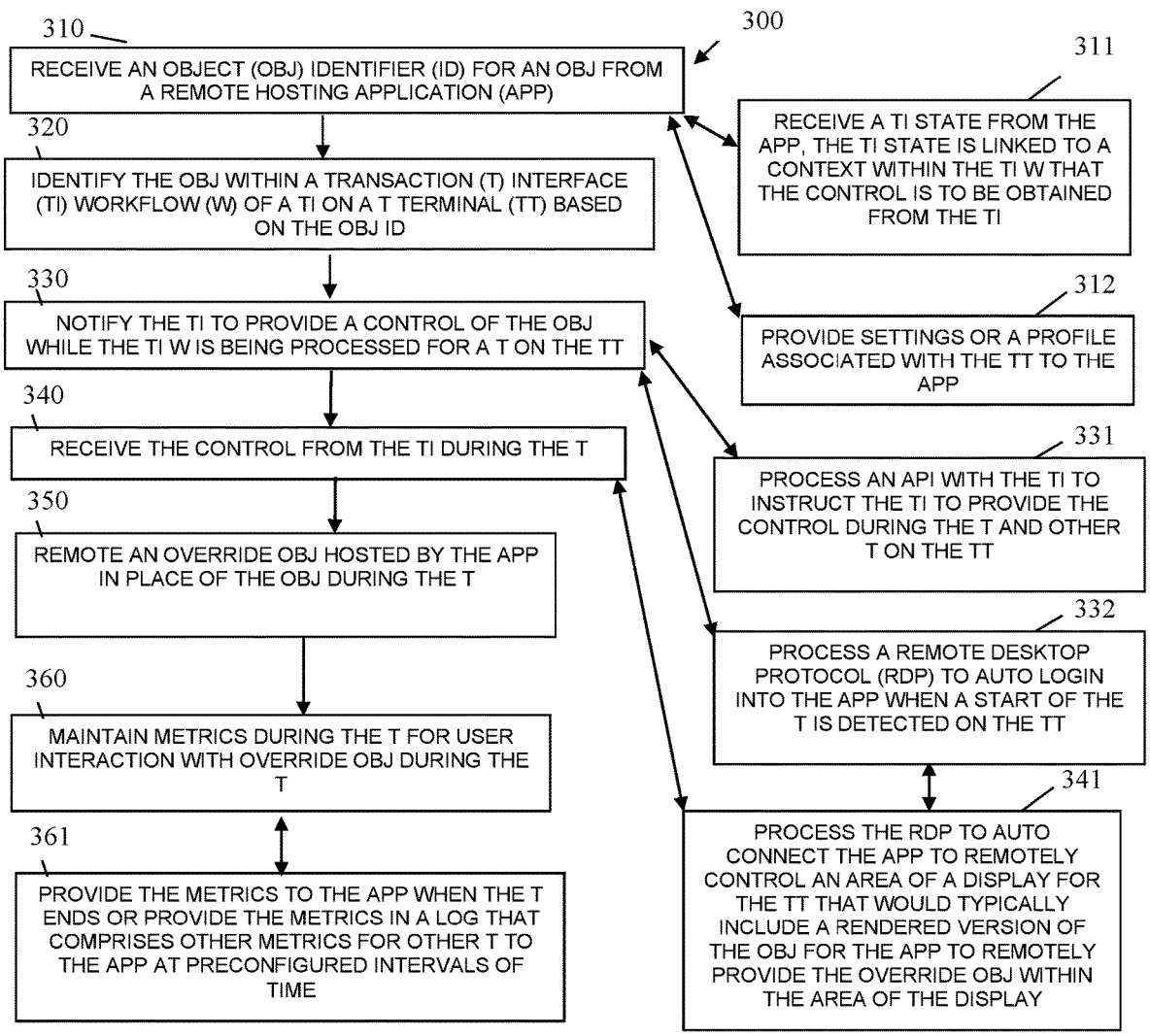
FIG. 3 is a diagram of another method for providing remote access to a portion of a transaction interface during a transaction at a transaction terminal embodiment.

FIG. 3 is a diagram of another method 300 for providing remote access to a portion of a transaction interface during a transaction at a transaction terminal, according to an example embodiment. The software module(s) that implements the method 300 is referred to as a "TI screen/object override client agent." The TI screen/object override client agent is implemented as executable instructions programmed and residing within memory and/or a non-transitory computer-readable (processor-readable) storage medium and executed by one or more processors of one or more devices. The processor(s) of the device(s) that executes the TI screen/object override client agent are specifically configured and programmed to process the TI screen/object override client agent. The TI screen/object override client agent has access to one or more network connections during its processing. The network connections can be wired, wireless, or a combination of wired and wireless.

In an embodiment, the device that executes the TI screen/object override client agent is terminal 120. In an embodiment, the terminal 120, is an SST, an POS terminal, a kiosk, or an ATM.

In an embodiment, the TI screen/object override client agent interacts with method 200 during a transaction for purposes of overriding a portion (screen/object) of a TI 124 during a transaction on terminal 120 through interaction with the TI 120 and agent manager 114 or (method 200).

At 310, the TI screen/object override client agent receives an object identifier for an object from a remote hosting application (114/115 and/or method 200).

In an embodiment, at 311, the TI screen/object override client agent receives a TI state from the remote hosting application (114/115 and/or method 200). The TI state is linked to a context within the TI 124 that control is to be obtained from the TI 124.

In an embodiment, at 312, the TI screen/object override client agent provides settings, or a profile associated with the transaction terminal 120 to the remote hosting application (114/115 and/or method 200).

At 320, the TI screen/object override client agent identifies the object within a TI workflow of the TI 124 on the transaction terminal 120 based on the object identifier (received at 310).

At 330, the TI screen/object override client agent notifies the TI 124 to provide a control of the object while the TI workflow is being processed for a transaction on the transaction terminal 120.

In an embodiment, at 331, the TI screen/object override client agent processes an API with the TI 124 to instruct the TI 124 to provide the control during the transaction and during other transactions on the transaction terminal 120.

In an embodiment, at 332, the TI screen/object override client agent processes an RDP to auto login into the app (114/115 and/or method 200) when a start of the transaction is detected on the transaction terminal 120.

At 340, the TI screen/object override client agent receives the control from the TI 124 during the transaction.

In an embodiment of 332 and 340, at 341, the TI screen/object override client agent process the RDP to auto connect the remote hosting application (114/115 and/or method 200) to remotely control an area of a display for the transaction terminal 120 that would typically include a rendered version of the object to remotely provide the override object within the area of the display.

At 350, the TI screen/object override client agent remotes an override object hosted by the remote hosting application (114/115 and/or method 200) in place of the object during the transaction.

In an embodiment, at 360, the TI screen/object override client agent maintains metrics during the transaction for user interaction with the override object during the transaction.

In an embodiment of 360 and at 361, the TI screen/object override client agent provides the metrics to the remote hosting application (114/115 and/or method 200) when the transaction ends or the TI screen/object override client agent provides the metrics in a log that comprises the metrics and other metrics for other transactions to the remote hosting application (114/115 and/or method 200) at preconfigured intervals of time.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
   linking a portion of a transaction interface to an override object;
   communicating the portion to an agent on a transaction terminal associated with the transaction interface;
   receiving a request for the override object from the agent during a transaction on the transaction terminal;
   remotely hosting the override object that is rendered by the agent as a replacement for the portion of the transaction interface during the transaction, wherein the override object is dynamically controlled by a remote agent manager and includes content or one or more services delivered via the agent on the transaction terminal; and
   enabling, by the remotely hosting, real-time dynamic modifications to the transaction interface through specific interaction between a cloud server that performs the remotely hosting and the transaction terminal using a remote desktop protocol that provides automated connection and login capabilities for remotely controlling and updating portions of the transaction interface during ongoing transactions.

2. The method of claim 1, wherein linking further includes linking the portion to a specific transaction interface state associated with a transaction workflow for the transaction interface.

3. The method of claim 1, wherein linking further includes obtaining the override object from a third-party server or a retail server for a retailer based on a transaction terminal identifier for the transaction terminal.

4. The method of claim 3, wherein obtaining further includes normalizing attributes associated with the override object based on settings or a profile associated with the transaction terminal.

5. The method of claim 4, wherein normalizing further includes translating any written content or speech associated with the override object to expected written content or expected speech used at a location associated with the transaction terminal.

6. The method of claim 1, wherein communicating further includes providing a transaction interface state for the transaction interface with the portion to the agent to identify when during the transaction the agent is to obtain control over the portion and make the request.

7. The method of claim 1, wherein remotely hosting further includes processing the remote desktop protocol with the agent to remotely host the override object.

8. The method of claim 7, wherein processing further includes processing auto connection and auto login on behalf of the agent to establish a Remote Desktop connection with the agent to host the override object during the transaction.

9. The method of claim 1, wherein remotely hosting further includes hosting the override object to dynamically provide the content or the one or more services.

10. The method of claim 9, wherein hosting further includes hosting the override object as a particular service that is provided by a loyalty system or a promotion system of a retailer associated with the transaction terminal.

11. A system, comprising:
   a cloud server comprising at least one processor and a non-transitory computer-readable storage medium;
   a transaction terminal comprising at least one terminal processor and a terminal non-transitory computer-readable storage medium;
   the non-transitory computer-readable storage medium comprises executable instructions;
   the terminal non-transitory computer-readable storage medium comprises terminal executable instructions;
   the executable instructions when provided to and executed by the at least one processor from the non-transitory computer-readable storage medium cause the at least one processor to perform operations comprising:
   identifying a portion of a transaction interface that comprises an interface object that is to be overridden by an override object;

providing the portion to the transaction terminal;
receiving a request to deliver the override object from the transaction terminal during a transaction at the transaction terminal; and
remotely hosting the override object from the cloud server to the transaction terminal during the transaction, wherein the override object includes content or one or more services controlled remotely by a remote agent manager;
enabling, by the remotely hosting, real-time dynamic modifications to the transaction interface through specific interaction between the cloud server and the transaction terminal using a remote desktop protocol that provides automated connection and login capabilities for remotely controlling and updating portions of the transaction interface during ongoing transactions
the terminal executable instructions when provided to and executed by the at least one terminal processor from the terminal non-transitory computer-readable storage medium cause the at least one terminal processor to perform second operations comprising:

receiving the portion from the cloud server,
configuring the transaction interface to provide a control during a transaction interface workflow for the transaction;
receiving the control from the transaction interface;
notifying the cloud server of the control; and
interacting with the cloud server to render the override object in place of the portion during the transaction within the transaction interface.

12. The system of claim 11, wherein the transaction terminal comprises a point-of-sale (POS) terminal, a self-service terminal (SST), an automated teller machine (ATM), or a kiosk.

\* \* \* \* \*